Figure 1:
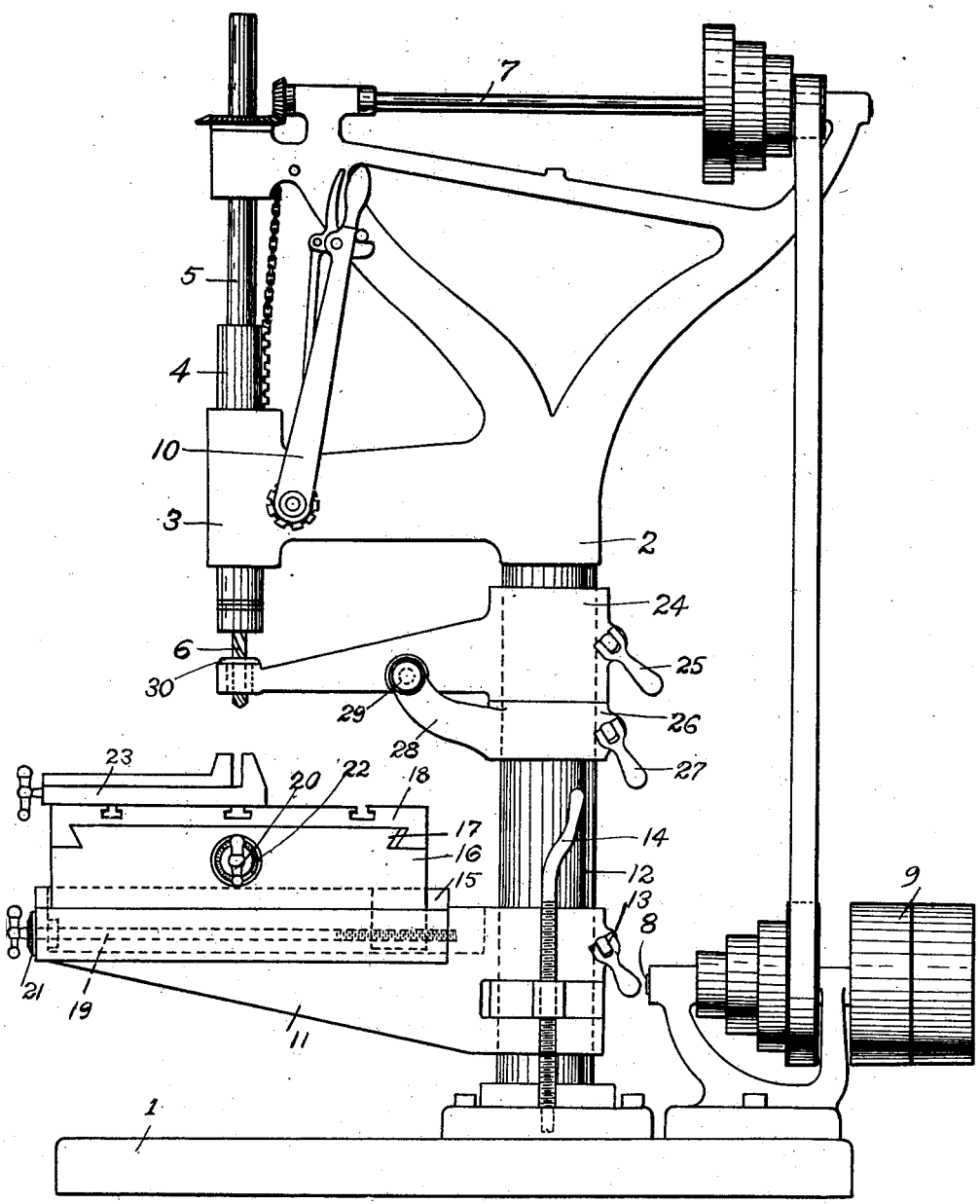

No. 819,372. PATENTED MAY 1, 1906.
H. F. NOYES.
DRILL PRESS.
APPLICATION FILED JUNE 14, 1904.

2 SHEETS—SHEET 1.

Witnesses

Inventor
Henry F. Noyes

No. 819,372. PATENTED MAY 1, 1906.
H. F. NOYES.
DRILL PRESS.
APPLICATION FILED JUNE 14, 1904.

2 SHEETS—SHEET 2.

Witnesses.

Inventor
Henry F. Noyes

UNITED STATES PATENT OFFICE.

HENRY F. NOYES, OF WAYNESBORO, PENNSYLVANIA.

DRILL-PRESS.

No. 819,372.　　　　Specification of Letters Patent.　　Patented May 1, 1906.

Application filed June 14, 1904. Serial No. 212,543.

*To all whom it may concern:*

Be it known that I, HENRY F. NOYES, a citizen of the United States, residing at Waynesboro, in the county of Franklin and State of Pennsylvania, have invented a new and useful Drill-Press, of which the following is a specification.

My invention relates to drill-presses having a vertical spindle carried by a frame, standard, column, or overhanging arm. In the use of drill-presses of this character if accuracy is desired two methods of drilling the work are commonly employed. In one method the position of the hole to be drilled is laid off on the work with dividers and a prick-punch and the drill started. Usually the drill will run a little to one side of the desired location, and to correct this before the drill has been sunk so that its lip is covered a slight groove is chipped in that side of the hole toward which it is desired to draw the drill, and oftentimes two or three trials will be necessary before the drill is finally centered with the accuracy desired. This must be completed before the lip of the drill is entirely sunk in the metal, for it cannot be drawn over any afterward, and frequently through careless workmanship the hole is not centered accurately and the work is spoiled. In the second method, which is usually employed where many pieces of a kind are desired, it is customary to make a "jig," as it is called, being a casting of a shape suitable to receive and adapted to clamp the work and provided with a hardened bushing adapted to receive and guide the drill close to the work, so that after the work is clamped in the jig the bushing will prevent the drill from running to one side of the desired location of hole. This evidently is an expensive way of effecting the desired result, as every change in the shape of work or location of hole requires a new jig.

The object of my invention is to provide, in combination with and as a part of an ordinary upright drill-press, drill-guiding means in the nature of a universal jig, which shall enable the operator to drill a hole in the work at a desired point and in a desired direction with the utmost facility and irrespective of the fact that the surface which is first engaged by the point of the drill is oblique to the axis of the drill, as where the hole has been started slightly out of position, thereby rendering it unnecessary to chip away the metal at the side of a previously-bored hole or recess to prevent the drill from running.

A further object of my invention is to adapt such drill-guiding means for use under practically all conditions in which a drill-press may be used and to enable the same to be adjusted readily to meet such conditions and also to enable it to be moved readily out of position to permit inspection of the work and back into position without readjustment.

I accomplish these objects by providing, in combination with an ordinary upright drilling-machine having a table which is universally adjustable horizontally, a drill-guiding means which is supported on the frame of the machine independently of the table and is adapted to be swung into axial alinement with the drill closely adjacent the surface of the work and then to be rigidly secured in such position.

Figure 2:
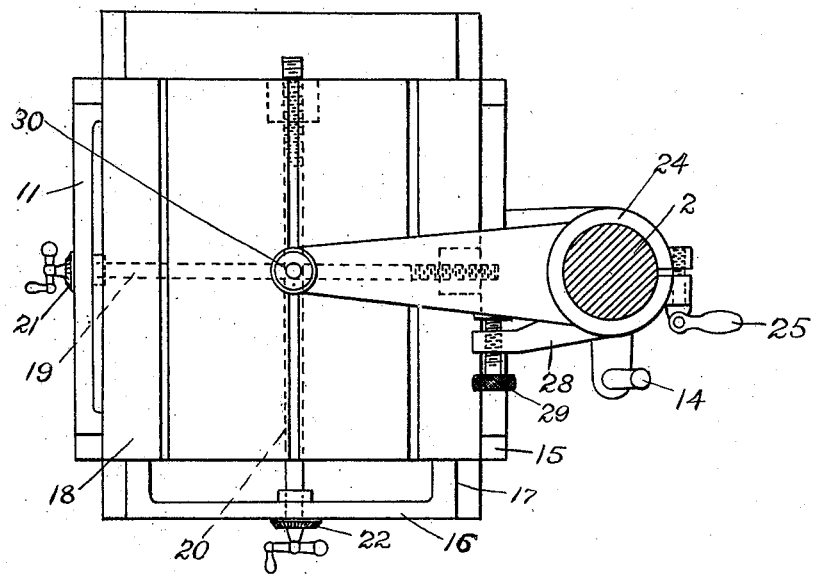

In the drawings, Figure 1 illustrates in side elevation an ordinary upright drilling-machine provided with my invention, and Fig. 2 is a plan view showing the drill-guiding means and means for supporting the work.

Similar reference-numerals refer to similar parts in both views.

As shown in the drawings, the base 1 is provided with the usual vertical standard or column 2, said column being turned down to provide a cylindrical portion 12. The frame, supported by said column, is provided with a box 3, having a vertically-movable sleeve 4 therein, and a drill-spindle 5 is swiveled and rotatably mounted in said sleeve, so that the drill 6, carried in the lower end of said spindle, may rotate about a vertical axis or a line parallel to the longitudinal center line of the turned portion 12 of the column 2. The drill-spindle is adapted to be driven by the usual shafts 7 and 8 and pulleys 9. A hand-lever 10 is journaled in the frame, with which the sleeve 4 and drill-spindle 5 may be moved vertically or axially, as is usual in this class of devices.

To support the work, I provide a bed 11, which is mounted upon the turned portion 12 of the column 2, so that it may swing horizontally, a clamping-screw 13 being provided to lock the bed in any desired position. A vertical adjusting-screw 14 is also provided to raise and lower the bed. The upper horizontal surface of the bed is provided with ways 15, between which a cross-slide 16 is fitted, and the latter is provided with ways 17, between which a work-carrying slide or table 18 is also fitted, said ways 15 and 17 being arranged exactly at right angles to each other. Said slides 17 and 18 are respectively provided with adjusting-screws 19 and 20, having graduated dials 21 and 22, by means of which micrometer adjustment of the slides may be effected. A vise 23 may be secured to the surface of the table 18 for use with small work, while for larger work the vise may be removed and the work clamped directly to the surface of said table.

A drill-guide arm 24 is mounted on the vertical cylindrical portion 12 of the column 2, so that it may be moved vertically of said column and may swing horizontally thereabout, and a clamping-screw 25 is provided for locking said arm in any desired position. A socket is provided in the outer end of arm 24, and a drill-guide 30 is held therein, said guide 30 consisting of a hardened-steel bushing having a central hole therethrough of a size suitable for the size drill to be used. One of said bushings is provided for each size of drill, and said bushings are readily removable and interchangeable and so arranged in the arm 24 that the center lines of their respective drill-receiving passages will describe a cylinder as the arm 24 is swung about its axis of which the axis of the drill is an element—that is, so that each drill and its corresponding guide may be held in axial alinement. A ring 26, having a clamping-screw 27, is provided on the portion 12 of column 2 below arm 24 and is adapted to provide a support for said arm when its clamping-screw 25 is loosened. An elbow 28 projects upwardly from ring 26 opposite arm 24 and is provided with a stop-screw 29, which is adapted to bear against said arm and hold the same from swinging movement in one direction beyond a position in which the drill-guide is in alinement with the drill's axis. As in practice the socket for the drill-guides and the drill-guides themselves will be bored out by the particular machine on which said guides are used after all the parts have been placed thereon, it follows that each drill-guide will be held in perfect alinement with the drill when placed in the socket of said arm without adjustment. As the drill's axis and the longitudinal central line of the turned portion 12 of the column are exactly parallel, the perfect alinement of the drill-guiding means will not be disturbed by adjusting the arm 24 vertically.

In practice the arms 24 and 28 are adjusted vertically to such a position that the lower end of the drill which is used may be raised above the level of the upper surface of the drill-guide 30 to permit the latter to be swung horizontally to one side of the drill.

In using my improved device the work is firmly secured in the vise 23 or to the table 18 in any well-known or convenient manner and the bed 11 is adjusted vertically until the upper surface of the work to be drilled is as close as practicable to the under surface of the drill-guide 30. The arm 24 is then swung to one side, and the drill is centered as accurately as possible with relation to the hole to be drilled by adjusting the slide 16 and table 18 horizontally. The drill-guide is then swung back into alinement with the drill, the previously-adjusted stop-screw 29 enabling this to be done with facility, and the arm 24 is locked, and the drill is passed through the guide into the work. If the operator is uncertain as to whether the hole is being started in exactly the desired position, he withdraws the drill from the guide 30 and swings the latter to one side before the drill has penetrated the work beyond its lip, and if upon examination he discovers that the work is not correctly positioned he will again adjust the slide 16 and table 18 horizontally to bring the work to the desired position with relation to the drill. The work having been readjusted, the guide is swung back into alinement with the drill and clamped in place, and then the drill is again passed through the guide into the work. As the work has been moved transversely of the axis of the drill the point of the latter will usually engage the oblique surface at one side of the previously-bored hole and but for the presence of the drill-guide the drill would be sprung and its point would run into or toward the center of the previously-bored hole and the adjustment of the work which has been made would be ineffectual; but as the guide holds the drill rigidly from springing at its point and causes it to rotate about its normal axis the point of the drill will cut away the metal at the side of the hole which it first engages and the drill will be passed into the work in a position exactly corresponding to the adjustment of the latter and as if the hole had not previously been started in a different position. The above-described operation of centering the work beneath the drill may be repeated until the desired accuracy of adjustment has been attained. If the hole to be bored is of such a depth that the guide prevents the drill-chuck from being brought into as close proximity to the work as may be necessary, the drill may be raised after it has penetrated the work beyond its lip, and the guide may be swung to one side out of the way of the drill-chuck.

It will be apparent from the foregoing that the fact that the drill-guide is supported independently of the table, so that the table may be adjusted vertically or horizontally, as desired, without in any way disturbing the axial adjustment of the drill-guide, is a feature of vital importance, for if the drill-guide moved with the table it would be thrown out of alinement with the drill, making a complete readjustment of the guide necessary. The provision of means for stopping the drill-guide in a position in which it is in axial alinement with the drill is also a feature of importance, as it enables the drill-guide to be moved into exact axial alinement with the drill with all possible facility, and as the arm which carries the guide is held from sliding down on the column 2 by the ring 26 the vertical adjustment of the guide will not be interfered with when arm 24 is unlocked.

If it is desired to drill two or more holes certain distances apart, after one is drilled the work can be readily moved the required distance by means of the dials, which are graduated to thousandths of an inch. It is also evident that in the majority of cases this invention makes jigs unnecessary and thereby saves a great deal of expensive work.

While I have shown my invention as applied to an upright drill, it is evident it can be as readily applied to the head of a radial drill or other styles of drill, and I therefore do not wish to be confined to the specific application shown.

I am aware that drill-presses having adjustable bases have been made before; but

What I claim is—

1. In a drilling-machine the combination with an axially-movable drill, a work-support, a drill-guide supported at one side of the drill and means permitting movement of said guide longitudinally and transversely of the drill, and means for locking said guide in axial alinement with the drill, substantially as described.

2. In a drilling-machine the combination with an axially-movable drill, a work-support, a drill-guide, an arm for supporting said guide in axial alinement with the drill, a standard, disposed at one side of and parallel to the drill on which said arm is mounted to swing transversely and move longitudinally thereof, and means for locking said arm when said guide is in axial alinement with the drill, substantially as described.

3. In a drilling-machine, the combination with an axially-movable drill, a work-support, a drill-guide, means permitting movement of said guide to one side of the drill in a path intersecting the axis thereof, a stop for limiting the movement of said guide when it is in axial alinement with the drill, and means for locking said guide, substantially as described.

HENRY F. NOYES.

Witnesses:
M. M. SHRIVER,
FANNY A. NOYES.